United States Patent
Schirmer et al.

(10) Patent No.: US 7,249,034 B2
(45) Date of Patent: *Jul. 24, 2007

(54) SYSTEM AND METHOD FOR PUBLISHING A PERSON'S AFFINITIES

(75) Inventors: Andrew Lewis Schirmer, Andover, MA (US); Cynthia Jeanne Regnante, North Andover, MA (US); David LeRoy Newbold, West Roxbury, MA (US)

(73) Assignee: International Business Machines Corporation, Armonk, NY (US)

(*) Notice: Subject to any disclaimer, the term of this patent is extended or adjusted under 35 U.S.C. 154(b) by 1084 days.

This patent is subject to a terminal disclaimer.

(21) Appl. No.: 10/044,923

(22) Filed: Jan. 15, 2002

(65) Prior Publication Data

US 2003/0135379 A1    Jul. 17, 2003

Related U.S. Application Data

(60) Provisional application No. 60/347,283, filed on Jan. 14, 2002.

(51) Int. Cl.
*G06Q 99/00* (2006.01)
(52) U.S. Cl. ............................... 705/1; 706/46
(58) Field of Classification Search ............ 705/1; 706/46

See application file for complete search history.

(56) References Cited

U.S. PATENT DOCUMENTS

| | | | |
|---|---|---|---|
| 4,744,028 A | 5/1988 | Karmarkar | 364/402 |
| 5,740,549 A | 4/1998 | Reilly et al. | 705/14 |
| 5,761,512 A | 6/1998 | Breslau et al. | 395/705 |
| 5,895,470 A | 4/1999 | Pirolli et al. | 707/102 |
| 5,966,707 A | 10/1999 | Van Huben et al. | 707/10 |
| 6,041,311 A | 3/2000 | Chislenko et al. | 705/27 |
| 6,078,918 A | 6/2000 | Allen et al. | 707/6 |
| 6,115,709 A | 9/2000 | Gilmour et al. | 707/9 |
| 6,144,944 A | 11/2000 | Kurtzman, II et al. | 705/14 |
| 6,154,783 A | 11/2000 | Gilmour et al. | 709/245 |
| 6,205,472 B1 | 3/2001 | Gilmour | 709/206 |
| 6,208,994 B1 | 3/2001 | Abdelnur | 707/103 |

(Continued)

FOREIGN PATENT DOCUMENTS

EP    1 087 306    3/2001

OTHER PUBLICATIONS

Maybury et al., "Expert Finding for Collaborative Virtual Environments", *Communications of the ACM*, vol. 44, No. 12, Dec. 2001, pp. 1, 2, 55, 56.

(Continued)

*Primary Examiner*—John G. Weiss
*Assistant Examiner*—Traci L. Casler
(74) *Attorney, Agent, or Firm*—Pillsbury Winthrop Shaw Pittman, LLP

(57) ABSTRACT

A system and method to control the review and publication of affinities. The system and method can be tailored to provide flexibility in the ways that affinity publication is controlled, thereby accommodating different cultural and legal constraints on information access. In one aspect, the system and method allows a person who is the subject of a proposed affinities to review the affinity and then approve or deny publication of the affinity before the affinity is made known to others, thus avoiding inappropriate publication. Advantageously, the system and method enable the person to review the affinity in a context that increases the likelihood that only accurate affinities will be published.

49 Claims, 6 Drawing Sheets

U.S. PATENT DOCUMENTS

| | | | |
|---|---|---|---|
| 6,240,466 B1 | 5/2001 | McKeehan et al. | 709/316 |
| 6,269,369 B1 | 7/2001 | Robertson | 707/10 |
| 6,349,295 B1 | 2/2002 | Tedesco et al. | 707/3 |
| 6,353,840 B2 | 3/2002 | Saito et al. | 707/517 |
| 6,377,949 B1 | 4/2002 | Gilmour | 707/10 |
| 6,377,983 B1 | 4/2002 | Cohen et al. | 709/217 |
| 6,397,203 B1 | 5/2002 | Hembry | 707/2 |
| 6,405,197 B2 | 6/2002 | Gilmour | 707/5 |
| 6,421,669 B1 | 7/2002 | Gilmour et al. | 707/9 |
| 6,513,039 B1 | 1/2003 | Kraenzel | 707/9 |
| 6,516,350 B1 | 2/2003 | Lumelsky et al. | 709/226 |
| 6,553,365 B1 | 4/2003 | Summerlin et al. | 707/2 |
| 6,560,588 B1 | 5/2003 | Minter | 706/50 |
| 6,564,217 B2 | 5/2003 | Bunney et al. | 707/10 |
| 6,604,110 B1 | 8/2003 | Savage et al. | 707/102 |
| 6,626,957 B1 | 9/2003 | Lippert et al. | 715/513 |
| 6,633,916 B2 | 10/2003 | Kauffman | 709/229 |
| 6,640,229 B1 | 10/2003 | Gilmour et al. | 707/9 |
| 6,647,384 B2 | 11/2003 | Gilmour | 707/5 |
| 6,668,251 B1 | 12/2003 | Goldberg | 707/5 |
| 6,687,873 B1 | 2/2004 | Ballantyne et al. | 715/500 |
| 6,697,800 B1 | 2/2004 | Jannink et al. | 707/5 |
| 6,711,570 B1 | 3/2004 | Goldberg et al. | 707/6 |
| 6,714,936 B1 | 3/2004 | Nevin, III | 707/102 |
| 6,732,331 B1 | 5/2004 | Alexander | 715/513 |
| 6,754,648 B1 | 6/2004 | Fittges et al. | 707/1 |
| 6,772,137 B1 | 8/2004 | Hurwood et al. | 707/2 |
| 6,789,054 B1 | 9/2004 | Makhlouf | 703/6 |
| 6,801,940 B1 | 10/2004 | Moran et al. | 709/224 |
| 6,816,456 B1 | 11/2004 | Tse-Au | 370/230.1 |
| 6,832,224 B2 | 12/2004 | Gilmour | 707/100 |
| 6,836,797 B2 | 12/2004 | Givoly et al. | 709/223 |
| 7,043,698 B2 | 5/2006 | Newbold | 715/789 |
| 2002/0049621 A1 | 4/2002 | Bruce | 705/7 |
| 2002/0049750 A1 | 4/2002 | Venkatram | 707/3 |
| 2002/0078003 A1 | 6/2002 | Krysiak et al. | 707/1 |
| 2002/0087600 A1* | 7/2002 | Newbold | 707/514 |
| 2002/0107861 A1 | 8/2002 | Clendinning et al. | 707/101 |
| 2002/0111934 A1 | 8/2002 | Narayan | 707/1 |
| 2002/0152244 A1 | 10/2002 | Dean et al. | 707/530 |
| 2003/0028525 A1 | 2/2003 | Santos et al. | 707/3 |
| 2003/0105732 A1 | 6/2003 | Kagalwala et al. | 707/1 |
| 2004/0068477 A1* | 4/2004 | Gilmour et al. | 707/1 |
| 2004/0111386 A1 | 6/2004 | Goldberg et al. | 707/1 |
| 2004/0205548 A1 | 10/2004 | Bax et al. | 715/513 |

OTHER PUBLICATIONS

Mattox et al., "Enterprise Expert and Knowledge Discovery", *Proceedings of the International Conference on Human Computer Interaction Conference*, Aug. 23-27, 1999, Munich, Germany, 11 pages.

"Automated Expertise Profiling Saves Time", http://www.tacit.com/products/profiling.html, printed Jan. 9, 2002, 3 pages.

"KnowledgeMail", http://www.tacit.com/products/knowledgemail.html, printed Jan. 9, 2002, 3 pages.

"Expertise Discovery & Search", http://www.tacit.com/products/espdiscovery.html, printed Jan. 9, 2002, 2 pages.

Vivacqua, Adriana, et al., "Agents to Assist in Finding Help", *Conference on Human Factors & Computing Systems Proceedings*, in the Hague, the Netherlands, Apr. 2000, pp. 65-72.

Tacit, KnowledgeMall & KnowledgeMall Plus, "Creating the Smarter Enterprise" (Tacit Knowledge Systems, Inc., © May 2001).

http://www.forbes.com/global/2001/0205/088_print.html, as it appears on Feb. 26, 2001.

McDonald, David W., "Evaluating Expertise Recommendations", *Proceedings of the 2001 International ACM SIGGROUP Conference on Supporting Group Work*, in Boulder, Colorado, Oct. 2, 2001, pp. 214-223.

http://www.tacit.com, as it appears on Dec. 7, 2000.

Wang, Jidong, et al., "Ranking User's Relevance to a Topic Through Link Analysis on Web Logs", *Proceedings of the 4th International Workshop on Web Information and Data Management* In McLean, Virginia, ACM Press, Nov. 8, 2002, pp. 49-54.

* cited by examiner

SYSTEM AND METHOD FOR PUBLISHING A PERSON'S AFFINITIES

CROSS REFERENCE TO RELATED APPLICATIONS

This application claims priority to U.S. Provisional Patent Application Ser. No. 60/347,283 entitled "Knowledge Server," filed on Jan. 14, 2002, the contents of which are incorporated by reference into this patent application.

This application is related to the following commonly owned U.S. patent applications, all of which are hereby incorporated by reference into the present application: (1) U.S. patent application Ser. No. 09/401,581, entitled METHOD AND SYSTEM FOR PROFILING USERS BASED ON THEIR RELATIONSHIP WITH CONTENT TOPICS, filed Sep. 22, 1999; (2) U.S. patent application Ser. No. 10/045,059 entitled METHOD AND SYSTEM FOR PROFILING USERS BASED ON THEIR RELATIONSHIP WITH CONTENT TOPICS, filed Jan. 15, 2002; (3) U.S. patent application Ser. No. 10/044,921 entitled SYSTEM AND METHOD FOR MINING A USER'S ELECTRONIC MAIL MESSAGES TO DETERMINE THE USER'S AFFINITIES, filed Jan. 15, 2002; (4) U.S. patent application Ser. No. 10/044,922 entitled SYSTEM AND METHOD FOR CALCULATING A USER AFFINITY, filed Jan. 15, 2002; and (5) U.S. patent application Ser. No. 10/044,914 entitled SYSTEM AND METHOD FOR IMPLEMENTING A METRICS ENGINE FOR TRACKING RELATIONSHIPS OVER TIME, filed Jan. 15, 2002.

BACKGROUND OF THE INVENTION

1. Field of the Invention

The present invention relates to the field of knowledge management, and, more specifically, to a system and method for affinity review and approval.

2. Discussion of the Background

When a person is attempting to accomplish a task, it is often useful for the person to obtain information from other people who have knowledge of the topics with which the task is concerned. To do so, the person must have a way to discover the people who have the information the person is seeking to obtain. One way of facilitating this discovery is to publish people's "affinities," which are simply links between people and categories or topics of information. Each affinity may include a value representing the strength of the relationship with the category—the higher the value, the greater the person's affinity for the topic.

It is possible that publishing a person's affinity (i.e., making the affinity known to others) would be inappropriate, either because the affinity is inaccurate or misleading, or because it reveals an accurate relationship with a topic that the person does not wish to make public. Therefore, it is important to provide ways for people to judge their proposed affinities accurately and to avoid affinity publication in such cases. Recognizing that policies concerning affinity publication may be affected by different cultures and laws, the solution to these problems must be flexible as well.

SUMMARY OF THE INVENTION

The present invention provides a system and method to control the review and publication of affinities. The system and method can be tailored to provide flexibility in the ways that affinity publication is controlled, thereby accommodating different cultural and legal constraints on information access.

In one aspect, the system and method allows a person who is the subject of a proposed affinities to review the affinity and then approve or deny publication of the affinity before the affinity is made known to others, thus avoiding inappropriate publication. Advantageously, the system and method enable the person to review the affinity in a context that increases the likelihood that only accurate affinities will be published. The system and method further allow an administrator to tailor the affinity review and approval process by enabling the administrator to create an affinity publication policy that is used in determining which affinities are published. The system and method also allows individuals to declare their own affinities without waiting for the system to find them, and for designating affinities for other people.

The above and other features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

While the present invention may be embodied in many different forms, there is described herein in detail an illustrative embodiment with the understanding that the present disclosure is to be considered as an example of the principles of the invention and is not intended to limit the invention to the illustrated embodiment.

Figure 1:
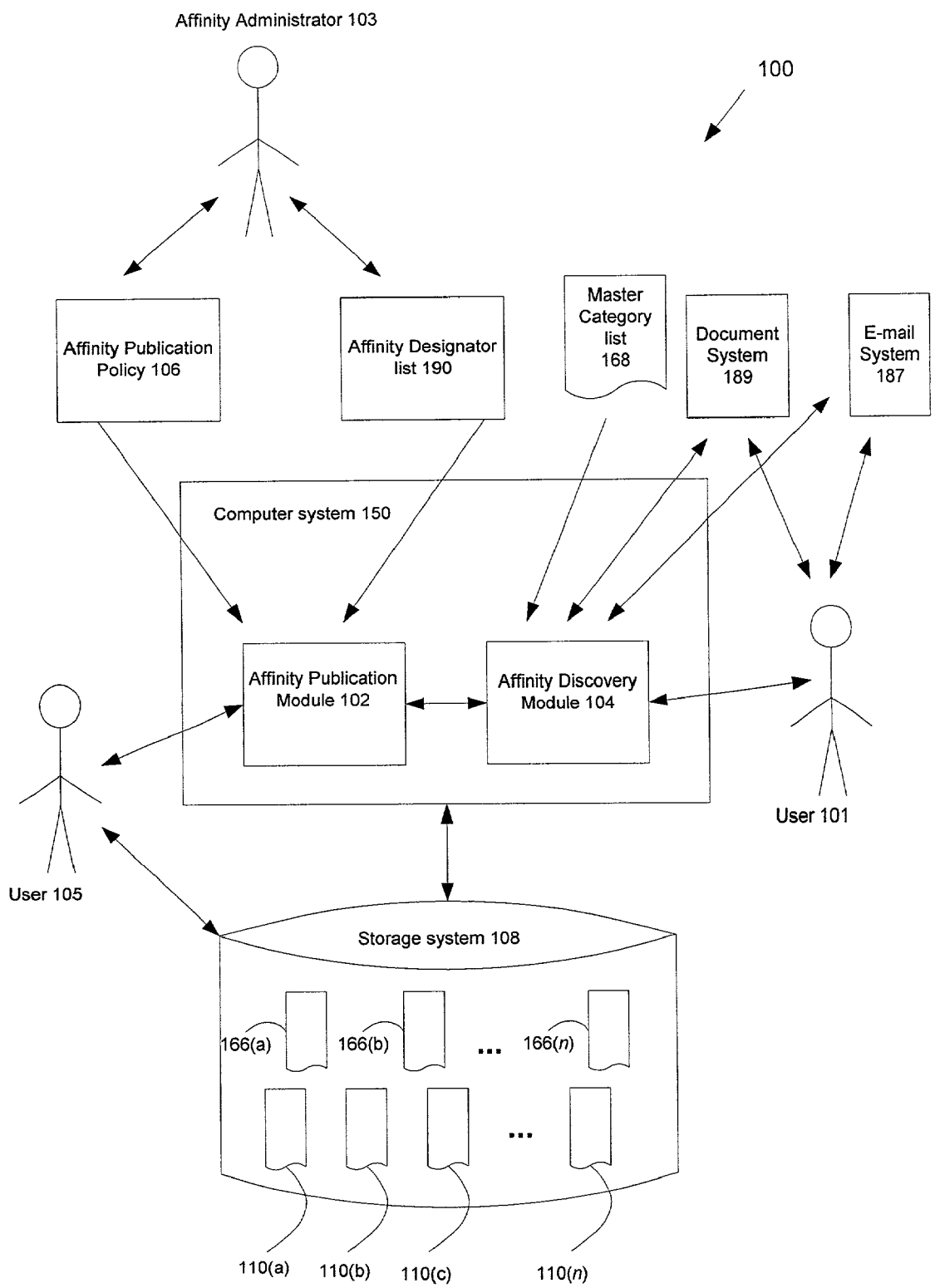
FIG. 1 is a functional block diagram of a system according to one embodiment of the present invention.

FIG. 1 is a functional block diagram of a system 100 according to one embodiment of the present invention. System 100 includes a computer system 150 for executing an affinity publisher software module 102 and an affinity discovery software module 104, an affinity publication policy 106, and a storage system 108 that stores a plurality of user profiles 110 and a plurality of category profiles 166, wherein each user profile 110 is a set of information that is associated with a particular user (e.g., profile 110(*b*) is associated with a user 101), and wherein each category profile 166 is a set of information associated with a particular category. Storage system 108 includes one or more storage devices so that user profiles 110 and category profiles 166 need not be stored on the same storage device. A profile can be a single computer file, one or more computer files, one or more records in a database, etc. Computer system 150 includes one or more computers (not shown).

Affinity discovery module 104 functions to monitor the activities of user 101 to determine the subject matters (i.e., categories) for which user 101 appears to have an affinity, determines the strength of the affinity for each determined category, and assigns an affinity value to the determined affinity. As an example, affinity discovery module 104 may be operable to access an electronic mail (e-mail) system 187 to examine the e-mails sent to and from user 101 and may be operable to access a document repository 189 to examine the documents authored or viewed by user 101. For example, if user 101 has recently authored and viewed several documents associated with the category of "computer security," then affinity discovery module 104 will know this because it monitors user 101's document activity. Consequently, affinity discovery module 104 will determine that user 101 appears to have an affinity for "computer security" based on user 101's document activity. Additionally, affinity discovery module 104 will assign an affinity value to the affinity. The affinity value represents the strength of user 101's affinity for the category.

After affinity discovery module 104 determines that user 101 appears to have an affinity for a particular category and assigns an affinity value to the affinity, module 104 submits the "affinity" to affinity publisher module 102. That is, module 104 submits the name of the category and the calculated affinity value to module 102.

Upon receiving a submitted affinity, affinity publisher module 102 applies an affinity publication policy 106 to determine whether it should publish user 101's apparent affinity for the particular category. Affinity publication policy 106 includes rules and other information that govern the publication of affinities. In one embodiment, publication policy 106 can only be created and modified by an affinity administrator 103. In other embodiments, affinity administrator 103 as well as other users can create and/or modify the affinity publication policy.

Affinity publication policy 106 preferably includes some or all of the following information: an affinity threshold value, an indication as to whether publisher module 102 must get permission from a user prior to publishing the user's affinities, an auto-response grace period, a setting for an auto-publish flag, and other information. Other information and other rules can be included in publication policy 106. The ability of administrator 103 to create an affinity publication policy creates a unique advantage because this features allows system 100 to be flexible and, thus, easily adapt to different cultures and laws regarding publication of private information.

If, based on affinity publication policy 106, module 102 determines that it should publish user 101's apparent affinity for the particular category, then, in one embodiment, module 102 updates one or both of the user profile 110 associated with user 101 (e.g., user profile 110(*b*)) and the category profile 166 associated with the particular category, so that the update profile indicates that user 101 has an affinity for the particular category. The user profile 110 and/or category profile 166 is/are also updated to indicate the affinity value assigned to the affinity.

Profiles 110 and 166 may be searched by third parties or search engines. In this way, after affinity publisher module 102 publishes user 101's affinity for the particular subject matter, a third person or a search engine or other system is able to determine that user 101 has an affinity for the particular category simply by examining profiles 110 and/or 166. In this way, a person who seeks to discover individuals who are likely to have knowledge and/or expertise about a certain topic can easily do so simply by searching profiles 110/166.

In one embodiment, system 100 includes a single affinity publication policy 106 (also referred to as "default affinity publication policy 106") that applies to all users whose activities are being monitored. In another embodiment, a user whose activities are being monitored may have his or her own affinity publication policy which overrides the default affinity publication policy. That is, when a user has his or her own affinity publication policy, affinity publisher module 102 uses that affinity publication policy instead of the default affinity publication policy in determining whether or not to publish an affinity for the user.

Figure 2:
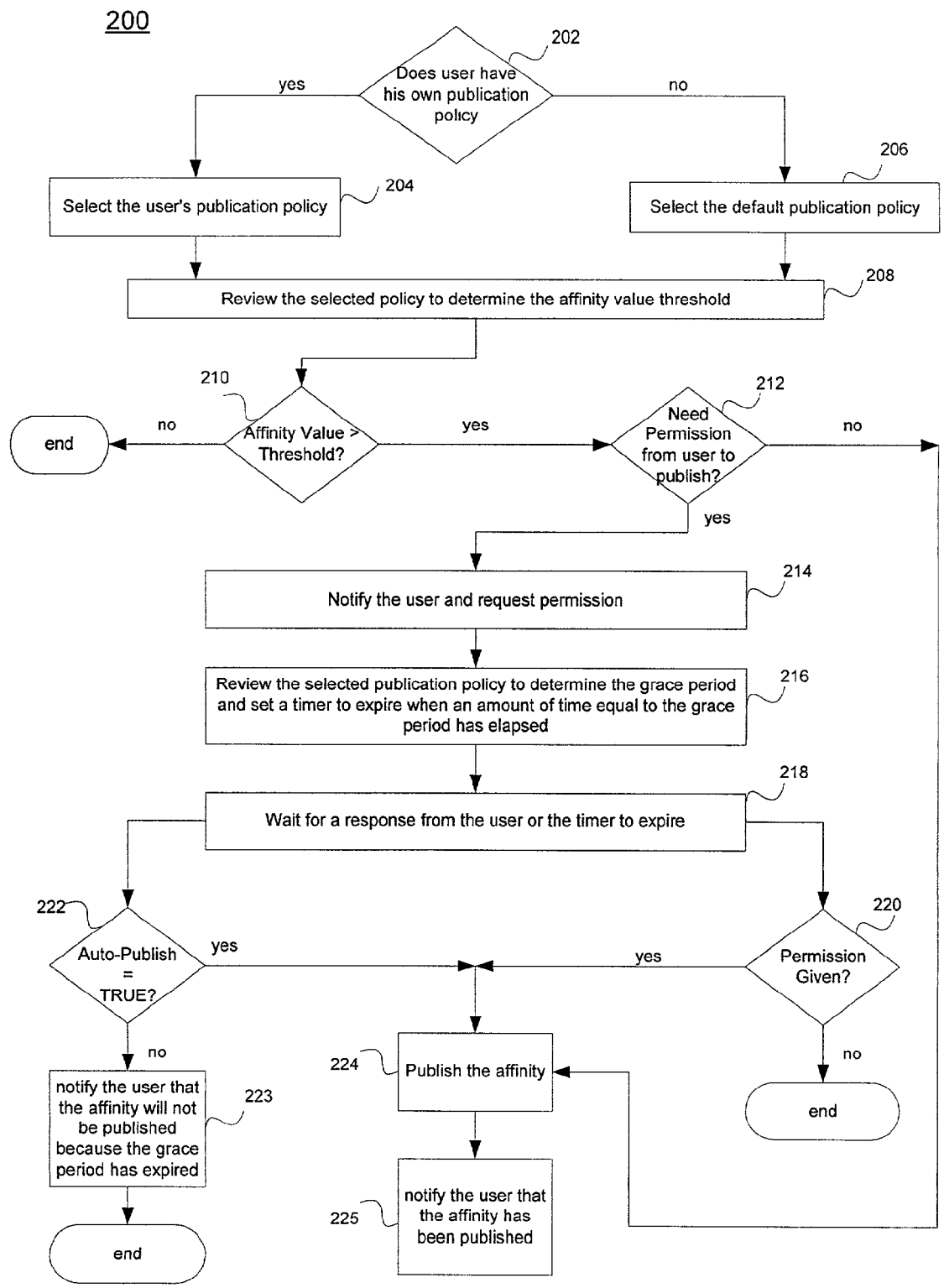
FIG. 2 is a flow chart illustrating a process, according to one embodiment, performed by affinity publisher module.

FIG. 2 is a flow chart illustrating a process 200 performed by affinity publisher module 102 after discovery module 104 determines that user 101 appears to have an affinity for a particular category, assigns an affinity value for the apparent affinity, and submits the affinity to module 102. Process 200 begins in step 202, where module 102 determines whether user 101 has his or her own affinity publication policy. If user 101 has his or her own affinity publication policy, module 102 selects that affinity publication policy (step 204), otherwise, module 102 selects default affinity publication policy 106 (step 206). Next (step 208), module 102 determines the selected policy's affinity threshold. Next (step 210), module 102 determines whether the affinity value assigned by discovery module 104 exceeds the determined affinity threshold. If the assigned affinity value does not exceed the affinity threshold, the process ends, otherwise the process continues in step 212.

In step 212, module 102 determines whether the publication policy indicates that module 102 must get permission from user 101 prior to publishing user 101's affinities. If the publication policy indicates that module 102 must get permission from user 101 prior to publishing user 101's affinities, then control passes to step 214, otherwise control passes to step 224.

In step 214, module 102 notifies user 101 of user 101's apparent affinity for the particular category and requests permission from user 101 to publish the affinity. In one embodiment, as described above, a category profile, such as profile 166(*b*) is associated with the particular category. Category profile 166(*b*) may include: the names of all of the people that have a published affinity for the particular category, the names of the documents (if any) that are linked with or associated with the particular category, and information concerning the relationship between the particular category and other categories. In this embodiment, module 102 may send to user 101 the information included in category profile 166(*b*) along with the affinity notification because user 101 may find the information included in category profile 166(*b*) useful when determining the accuracy of the affinity and whether or not to approve publication of the affinity. In one embodiment, the affinity notification sent to user 101 includes not only the name of a category and an affinity value associated with the category, but also one or more keywords that are associated with the category. This additional information gives user 101 a better context for determining whether or not he or she wants to have the affinity published.

Next (step 216), module 102 determines the auto-response grace period for the selected affinity publication policy and sets a timer to expire when an amount of time equal to the grace period has elapsed. Next (step 218), module 102 waits for a response from user 101 or for the timer to expire. If a response is received before the timer expires, control passes to step 220, otherwise control passes to step 222.

In step 220, module 102 determines whether the response indicates that user 101 has approved the publication of the affinity. If the response indicates that user 101 has approved the publication of the affinity, control passes to step 224, otherwise the process ends.

In step 222, module 102 determines whether the selected affinity publication policy's auto-publish flag is set to TRUE. If it is, control passes to step 224, otherwise control passes to step 223, where module 102 notifies user 101 that the affinity will not be published because the grace period has expired. The process ends after step 223.

In step 224, module 102 publishes the affinity. In one embodiment, module 102 publishes the affinity by updating profile 110(b), which is associated with user 101, such that profile 110(b) indicates that user 101 has an affinity for the particular category. Advantageously, profile 110(b) may also be updated to indicate the strength of the affinity. That is, for example, the affinity value assigned to the affinity can be included in profile 110(b) along with the information that indicates user 101 has an affinity for the category. After the affinity is published, module 102 may notify user 101 that the affinity was published (step 225). Preferably, in addition to (or instead of) updating profile 110(b), module 102 updates the category profile 166 that is associated with the particular category so that the category profile indicates that user 101 has an affinity for the particular category.

Figure 3:
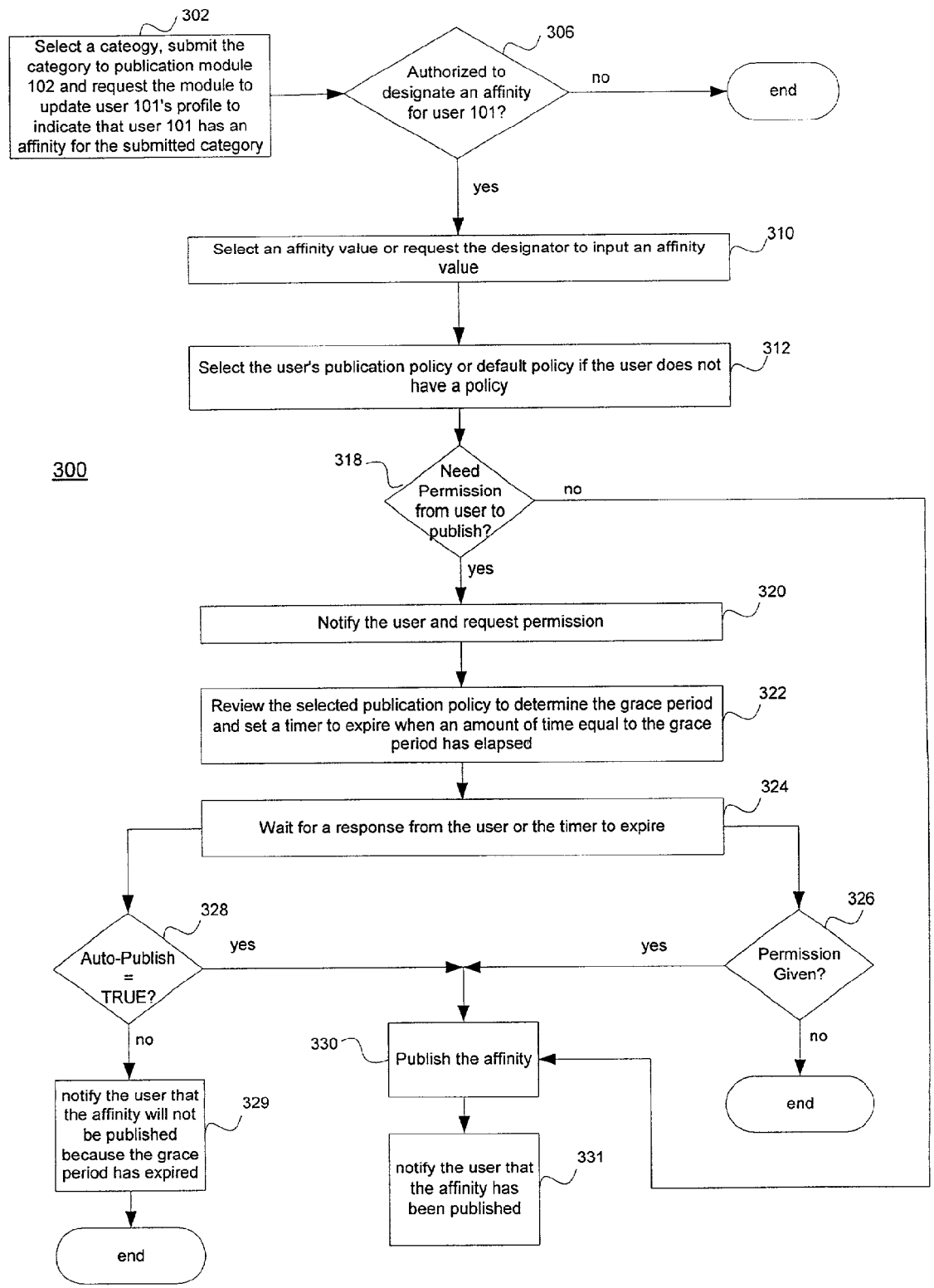
FIG. 3 is a flow chart illustrating a process, according to one embodiment, for publishing a designated affinity.

FIG. 3 is a flow chart illustrating a process 300 for publishing a designated affinity for user 101. A designated affinity for user 101 is an affinity assigned to user 101 by a third-party, such as user 101's manager, who may wish to assign an affinity to user 101.

Process 300 begins in step 302, where user 105 selects a category, submits the category to module 102, and requests module 102 to update user 101's profile (i.e., profile 110(b)) to indicate that user 101 has an affinity for the submitted category. In step 306, module 102 determines whether user 105 is authorized to designate an affinity for user 101. If user 105 is not so authorized, process 300 ends, otherwise control passes to step 310. In one embodiment, module 102 determines whether user 105 is authorized to designate affinities for user 101 by examining an affinity designator list 190. Preferably, administrator 103 controls the list and authorizes a user (such as user 105) to designate affinities for another user (such as user 101) by adding an entry to list 190 that indicates that the user has permission to designate affinities for the other user.

In step 310, module 102 either selects an affinity value or requests user 105 to input an affinity value. In step 312, module 102 determines whether user 101 has his or her own affinity publication policy, and, if user 101 has his or her own affinity publication policy, selects that affinity publication policy, otherwise, selects default affinity publication policy 106.

In step 318, module 102 determines whether the publication policy indicates that module 102 must get permission from user 101 prior to publishing the designated affinity. If the publication policy indicates that module 102 must get permission from user 101 prior to publishing the designated affinity, then control passes to step 320, otherwise control passes to step 330.

In step 320, module 102 notifies user 101 of the proposed designated affinity and requests permission from user 101 to publish the affinity. In step 322, module 102 determines the selected affinity publication policy's auto-response grace period and sets a timer to expire when an amount of time equal to the grace period has elapsed. In step 324, module 102 waits for a response from user 101 or for the timer to expire. If a response is received before the timer expires, control passes to step 326, otherwise 330, control passes to step 328.

In step 326, module 102 determines whether the response indicates that user 101 has approved the publication of the designated affinity. If the response indicates that user 101 has approved the publication of the designated affinity, control passes to step 330, otherwise the process ends.

In step 328, module 102 determines whether the selected affinity publication policy's auto-publish flag is set to TRUE. If it is, control passes to step 330, otherwise control passes to step 329, where module 102 notifies user 101 that the affinity will not be published because the grace period has expired. The process ends after step 329.

In step 330, module 102 publishes the designated affinity. In one embodiment, module 102 publishes the designated affinity by updating profile 110(b), which associated with user 101, such that profile 110(b) indicates that user 101 has an affinity for the submitted category. Advantageously, profile 110(b) may also be updated to indicate the strength of the affinity. That is, for example, the affinity value obtained in step 310 can be included in profile 110(b) along with the information that indicates user 101 has an affinity for the category. After the affinity is published, user 101 may be notified that the affinity was published (step 331). Preferably, in addition to (or instead of) updating profile 110(b), module 102 updates the category profile 166 that is associated with the particular category so that the category profile indicates that user 101 has an affinity for the particular category.

Figure 4:
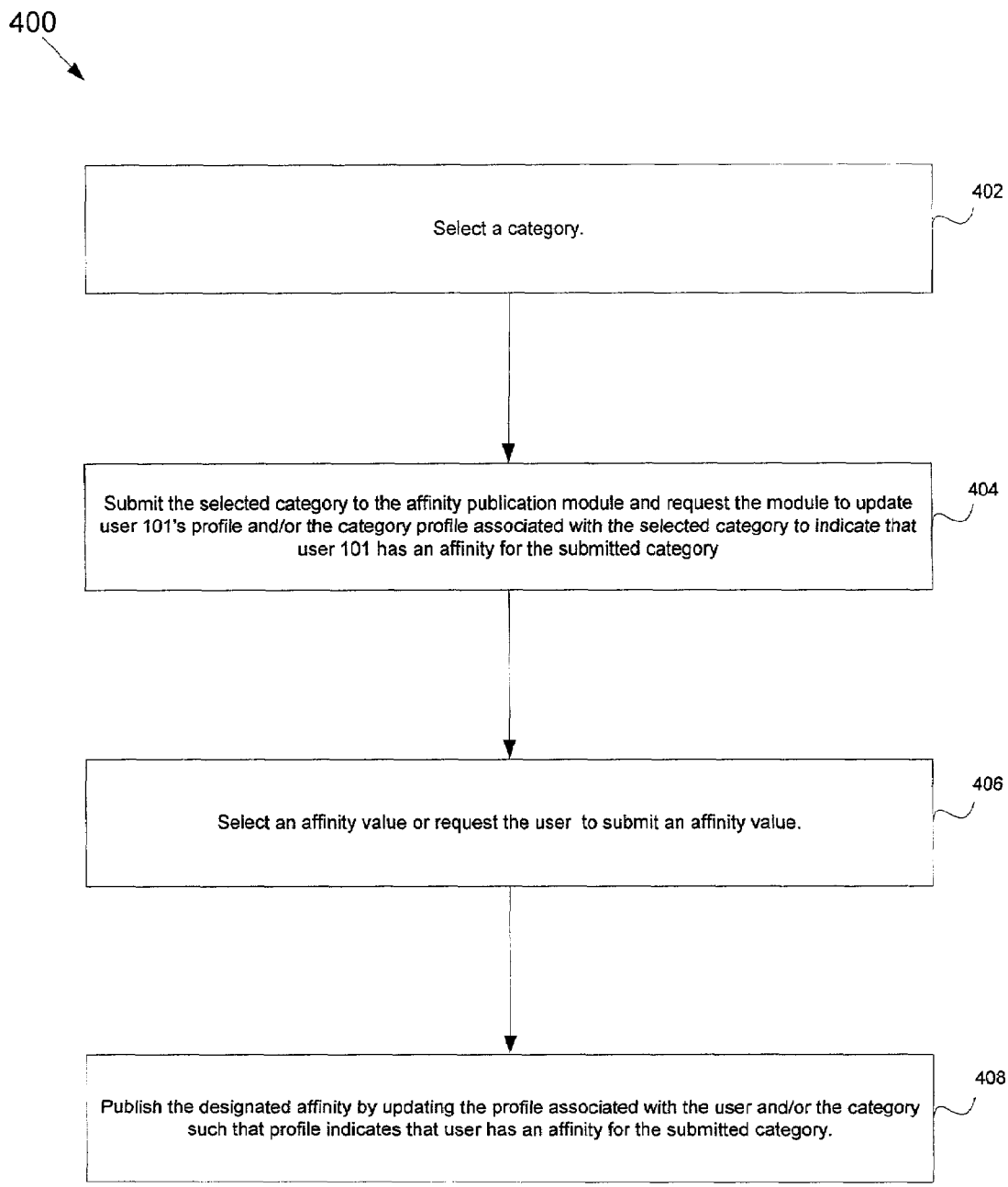
FIG. 4 is a flow chart illustrating a process, according to one embodiment, for enabling a user to declare and publish an affinity.

In addition to publishing derived affinities (that is, affinities determined by affinity discovery module 104) and designated affinities, module 102 can be configured to allow a user to declare his or her own affinities. FIG. 4 is a flow chart illustrating a process for enabling user 101 to declare and publish an affinity. Process 400 begins in step 402, where user 101 selects a category. In step 404, user submits the selected category to module 102. In step 406, module 102 either selects an affinity value or requests user 101 to submit an affinity value. In step 408, module 102 publishes the designated affinity.

Figure 5:
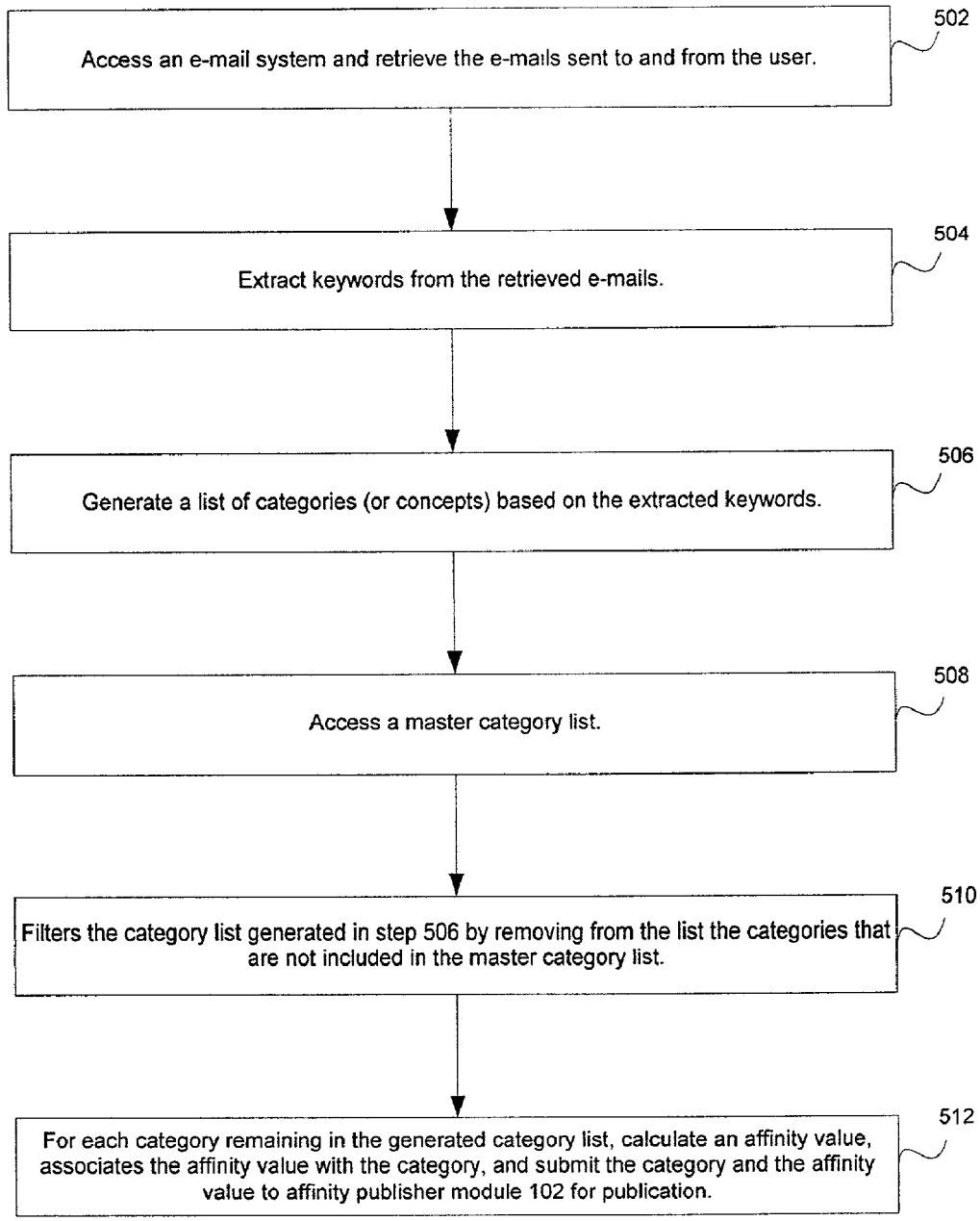
FIG. 5 is a flow chart illustrating a process, according to one embodiment, for mining electronic mail (e-mail).

FIG. 5 is a flow chart illustrating a process 500, which may be performed by affinity discovery module 104, for mining electronic mail (e-mail) for the purpose of determining a user's affinities. Process 500 begins in step 502, where module 104 accesses e-mail system 187 and retrieves the e-mails sent to and from the user. Next (step 504), module 104 extracts keywords from the retrieved e-mails. Next (step 506), module 104 generates a list of categories (or concepts) based on the extracted keywords. Next (step 508), module 102 access a master category list 168. Next (step 510), module 104 filters the category list generated in step 506 by removing from the list the categories that are not included in the master category list. Next (step 512), for each category remaining in the generated category list, module 104 calculates an affinity value, associates the affinity value with the category, and submits the category and the affinity value to affinity publisher module 102, which then performs process 200.

The feature of filtering the category list generated in step 506 based on the master category list provides a mechanism for protecting the user's privacy. It protects the user's privacy by ensuring that only the user's affinity for categories included in the master category list have a chance of being published. In other words, there is no chance that affinity publisher module 102 will publish the user's affinity for a category that is not on the master category list. In this way, system 100 provides privacy protection.

In one embodiment, when module 104 is mining the e-mails received by and/or sent from a particular user, module 104 uses keywords generated from the content of one or more of those e-mails to determine affinities for other users who also received or sent those e-mails. For example, if 15 of the e-mails received by user A were also received by or sent from user B, then when module 104 is mining user A's e-mails module 104 can use these 15 e-mails to discover affinities for user B. In this way, module 104 can determine affinities for user B based on e-mail content even if user B has not given module 104 permission to mine his or her e-mails.

Figure 6:
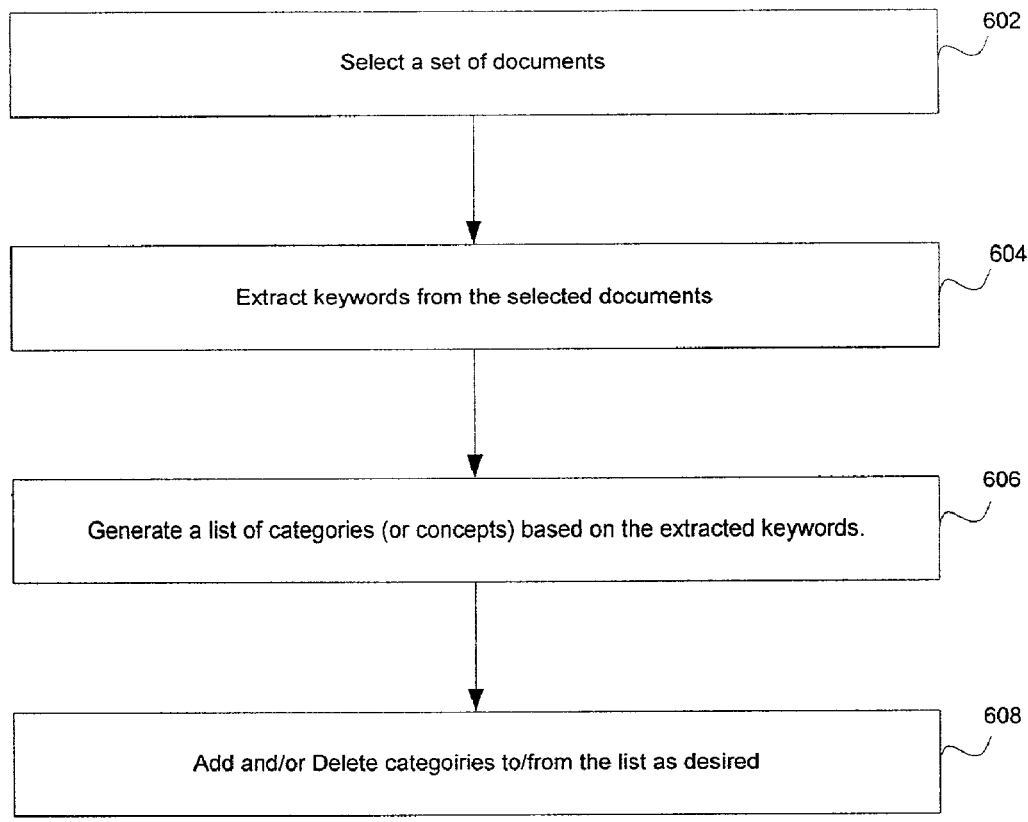
FIG. 6 is a flow chart illustrating a process, according to one embodiment, for creating a master category list.

FIG. 6 is a flow chart illustrating a process 600, according to one embodiment, for creating master category list 168. Process 600 begins in step 602, where a set of documents from one or more document repositories (such as repository 189) are accessed. In one embodiment, the set of documents may be selected by administrator 103, but in other embodiments the set of documents are selected according to other criteria, such as the author and/or type of document. Next (step 604) keywords are extracted from the set of documents. Next, (step 606), a list of categories (or concepts) based on the extracted keywords is generated. Lastly (step 608), categories can be manually added to and/or deleted from the list as desired.

While the illustrated processes 200, 300, 400, 500 and 600 are described as a series of consecutive steps, none of these processes are limited to any particular order of the described steps. Additionally, it should be understood that the various illustrative embodiments of the present invention described above have been presented by way of example only, and not limitation. Thus, the breadth and scope of the present invention should not be limited by any of the above-described exemplary embodiments, but should be defined only in accordance with the following claims and their equivalents.

What is claimed is:

1. A method for publishing information associated with a user, comprising the steps of:
   determining an affinity value for the user with respect to a topical category, wherein the affinity value represents a strength of a relationship between the user and the category;
   determining whether the affinity value crosses a predetermined threshold;
   in response to the affinity value crossing the threshold, determining whether to publish information related to the relationship between the user and the category, wherein determining whether to publish the information comprises:
      determining whether an affinity publication policy associated with the user indicates that the information should not be published without first receiving permission from the user to publish the information;
      transmitting to the user a message that requests the user to submit a response that indicates whether or not the user wishes to have the information published if it is determined that the affinity publication policy indicates that the information should not be published without first receiving permission from the user;
      determining whether the user submitted a response to the request within a predetermined period of time; and
      performing a default publication action if the user does not submit the response before the predetermined period of time expires,
   wherein the predetermined period of time is specified by the affinity publication policy associated with the user, and
   wherein the predetermined period of time is set by the user in the affinity publication policy.

2. The method of claim 1, wherein the default publication action is specified by the affinity publication policy associated with the user.

3. The method of claim 2, wherein the default publication action includes either (i) publishing the information related to the relationship between the user and the category, or (ii) not publishing the information related to the relationship between the user and the category.

4. The method of claim 3, wherein publishing the information comprises updating a profile associated with the user such that the profile indicates that the user has an affinity for the category.

5. The method of claim 3, wherein the default publication action includes publishing the information related to the relationship between the user and the category, and notifying the user that the information was published.

6. The method of claim 1, wherein the default publication action includes either (i) publishing the information related to the relationship between the user and the category, or (ii) not publishing the information related to the relationship between the user and the category.

7. The method of claim 3, wherein the default publication action includes not publishing the information related to the relationship between the user and the category, and notifying the user that the information will not be published.

8. The method of claim 6, wherein the default publication action includes publishing the information related to the relationship between the user and the category, and notifying the user that the information was published.

9. The method of claim 6, wherein the default publication action includes not publishing the information related to the relationship between the user and the category, and notifying the user that the information will not be published.

10. The method of claim 1, wherein the predetermined threshold is set by the user.

11. The method of claim 10, wherein the predetermined threshold is specified by the affinity publication policy.

12. The method of claim 11, further comprising the step of determining whether there is a particular affinity publication policy that is associated with the user.

13. The method of claim 1, wherein the predetermined threshold is specified by the affinity publication policy.

14. The method of claim 1, wherein the predetermined threshold is set by an administrator.

15. The method of claim 14, wherein the predetermined threshold is specified by the affinity publication policy.

16. The method of claim 1, wherein determining an affinity value for the user with respect to the category comprises monitoring the user's interaction with a set of one or more stored documents.

17. The method of claim 1, wherein determining an affinity value for the user with respect to the category comprises mining electronic mail messages sent to and from the user.

18. The method of claim 1, wherein determining an affinity value for the user with respect to the category comprises receiving a metric value input manually by an administrator.

19. The method of claim 1, wherein determining an affinity value for the user with respect to the category comprises receiving a metric value input manually by the user.

20. The method of claim 16, wherein the set of one or more stored documents are managed by a knowledge management system.

21. The method of claim 20, wherein the knowledge management system determines a master category list, and wherein the category is included in the master category list.

22. The method of claim 21, wherein the predetermined threshold is different for different categories included in the master category list.

23. A system for publishing, comprising:
affinity discovery module that function to discover one or more affinities of the user,
wherein the discovering an affinity includes (i) determining an affinity value for the user with respect to a topical category, the affinity value representing a strength of a relationship between the user and the category, and (ii) determining whether the affinity value crosses a predetermined threshold;
an affinity publication policy associated with the user, and
affinity publishing module that manages the publication of the discovered affinities,
wherein managing the publication of a discovered affinity includes (i) transmitting to the user a message that requests the user to submit a response that indicates whether or not the user wishes to have the affinity published, (ii) determining whether the user submitted a response to the request within a predetermined period of time, and (iii) performing a default publication action if the user does not submit the response before the predetermined period of time expires,
wherein the predetermined period of time is specified by the affinity publication policy associated with the user, and the predetermined period of time is set by the user in the affinity publication policy.

24. The system of claim 23, further comprising a storage system that stores the affinity publication policy associated with the user.

25. The system of claim 24, wherein the storage system stores a user profile associated with the user.

26. The system of claim 25, wherein the affinity publishing module publishes the affinities of the user by updating the user profile.

27. The system of claim 23, wherein the default publication action is specified by the affinity publication policy.

28. The system of claim 27, wherein the default publication action includes either (i) publishing the affinity, or (ii) not publishing the affinity.

29. The system of claim 28, wherein the default publication action includes either (i) publishing the affinity and notifying the user that the affinity was published, or (ii) not publishing the affinity and notifying the user that the affinity will not be published.

30. The system of claim 23, wherein the default publication action includes either (i) publishing the affinity, or (ii) not publishing the affinity.

31. The system of claim 30, wherein the default publication action includes either (i) publishing the affinity and notifying the user that the affinity was published, or (ii) not publishing the affinity and notifying the user that the affinity will not be published.

32. The system of claim 23, wherein the predetermined threshold is set by the user.

33. A computer program product for publishing information associated with a user, the computer program product being embodied in a computer readable medium and comprising computer instructions for:
determining an affinity value for the user with respect to a topical category, wherein the affinity value represents a strength of a relationship between the user and the category;
determining whether the affinity value crosses a predetermined threshold;
in response to the affinity value crossing the threshold, determining whether to publish information related to the relationship between the user and the category, wherein determining whether to publish the information comprises:
determining whether an affinity publication policy associated with the user indicates that the information should not be published without first receiving permission from the user to publish the information;
transmitting to the user a message that requests the user to submit a response that indicates whether or not the user wishes to have the information published if it is determined that the affinity publication policy indicates that the information should not be published without first receiving permission from the user;
determining whether the user submitted a response to the request within a predetermined period of time; and
performing a default publication action it the user does not submit the response before the predetermined period of time expires,
wherein the predetermined period of time is specified by the affinity publication policy associated with the user, and
wherein the predetermined period of time is set by the user in the affinity publication policy.

34. The computer program product of claim 33, wherein the default publication action is specified by the affinity publication policy.

35. The computer program product of claim 34, wherein the default publication action includes either (i) publishing the information related to the relationship between the user and the category, or (ii) not publishing the information related to the relationship between the user and the category.

36. The computer program product of claim 35, wherein the default publication action includes either (i) publishing the information related to the relationship between the user and the category, or (ii) not publishing the information related to the relationship between the user and the category.

37. The computer program product of claim 36, wherein the default publication action includes either (i) publishing the information related to the relationship between the user and the category and notifying the user that the information was published, or (ii) not publishing the information related to the relationship between the user and the category and notifying the user that the information will not be published.

38. The computer program product of claim 36, wherein the publishing the information comprises updating a profile associated with the user to indicate that the user has an affinity for the category.

39. The computer program product of claim 33, wherein the predetermined threshold is set by the user.

40. The computer program product of claim 39, wherein the predetermined threshold is specified by the affinity publication policy.

41. The computer program product of claim 33, wherein the predetermined threshold is specified by the affinity publication policy.

42. The computer program product of claim 33, wherein the predetermined threshold is set by an administrator.

43. The computer program product of claim 42, wherein the predetermined threshold is specified by the affinity publication policy.

44. The computer program product of claim 33, wherein determining an affinity value for the user with respect to the category comprises mining electronic mail messages sent to and from the user.

45. The computer program product of claim 33, wherein determining an affinity value for the user with respect to the category comprises monitoring the user's interaction with a set of one or more stored documents.

46. The computer program product of claim 33, wherein determining an affinity value for the user with respect to the category comprises receiving a metric value input manually by an administrator.

47. The computer program product of claim 33, wherein determining an affinity value for the user with respect to the category comprises receiving a metric value input manually by the user.

48. The computer program product of claim 45, wherein the set of one or more stored documents are managed by a knowledge management system.

49. The computer program product of claim 48, wherein the knowledge management system determines a master category list, and wherein the category is included in the master category list.

* * * * *